United States Patent
Domm

(10) Patent No.: US 8,965,161 B2
(45) Date of Patent: Feb. 24, 2015

(54) DECOHERED LASER LIGHT PRODUCTION SYSTEM

(75) Inventor: John Domm, Kitchener (CA)

(73) Assignee: Christie Digital Systems Inc., Cypress, CA (US)

( * ) Notice: Subject to any disclaimer, the term of this patent is extended or adjusted under 35 U.S.C. 154(b) by 377 days.

(21) Appl. No.: 13/253,428

(22) Filed: Oct. 5, 2011

(65) Prior Publication Data

US 2012/0027032 A1    Feb. 2, 2012

Related U.S. Application Data

(63) Continuation of application No. 11/964,394, filed on Dec. 26, 2007, now Pat. No. 8,059,928.

(51) Int. Cl.
*G02B 6/02* (2006.01)
*G02B 27/48* (2006.01)
*H04N 9/31* (2006.01)
*G02B 6/00* (2006.01)

(52) U.S. Cl.
CPC .............. *G02B 27/48* (2013.01); *H04N 9/3129* (2013.01); *H04N 9/3161* (2013.01)
USPC ............. 385/116; 385/31; 385/115; 385/133; 385/147

(58) Field of Classification Search
CPC ..................................................... G02B 27/48
USPC ............. 385/31, 115, 116, 133, 147; 372/108
See application file for complete search history.

(56) References Cited

U.S. PATENT DOCUMENTS

| | | | |
|---|---|---|---|
| 5,029,975 A | 7/1991 | Pease | |
| 6,249,381 B1 * | 6/2001 | Suganuma | 359/618 |
| 6,625,381 B2 | 9/2003 | Roddy et al. | |
| 2003/0011850 A1 * | 1/2003 | Sidorovich et al. | 359/172 |
| 2009/0109698 A1 | 4/2009 | Koyata et al. | |

FOREIGN PATENT DOCUMENTS

| | | |
|---|---|---|
| DE | 103 50 243 | 5/2005 |
| JP | 2000-46723 | 2/2000 |
| JP | 2000-111832 | 4/2000 |
| JP | 2000-121836 | 4/2000 |
| WO | WO 2006/980857 | 8/2006 |
| WO | 2007/007388 A1 | 1/2007 |
| WO | WO 2007/007388 A1 | 1/2007 |

OTHER PUBLICATIONS

Imai M. et al., "Speckle-pattern contrast of Semiconductor Laser Propagating in a Multimode Optical Fiber," Optics Communications, vol. 33, No. 1, pp. 4-8, Apr. 1, 1980.
U.S. Office Action mailed Oct. 15, 2010 in U.S. Appl. No. 11/964,394.

(Continued)

*Primary Examiner* — Rhonda Peace
(74) *Attorney, Agent, or Firm* — Staas & Halsey LLP

(57) ABSTRACT

A decohered laser light production system is provided. The decohered laser light system comprises a laser source. The system further comprises a multi-mode fiber having an input face, an output face and a body for propagating light from the input face to the output face, the input face arranged to accept laser light from the laser source, the body comprising a length such that laser light is generally decohered when exiting the output face.

13 Claims, 2 Drawing Sheets

(56) References Cited

OTHER PUBLICATIONS

Figure 1:
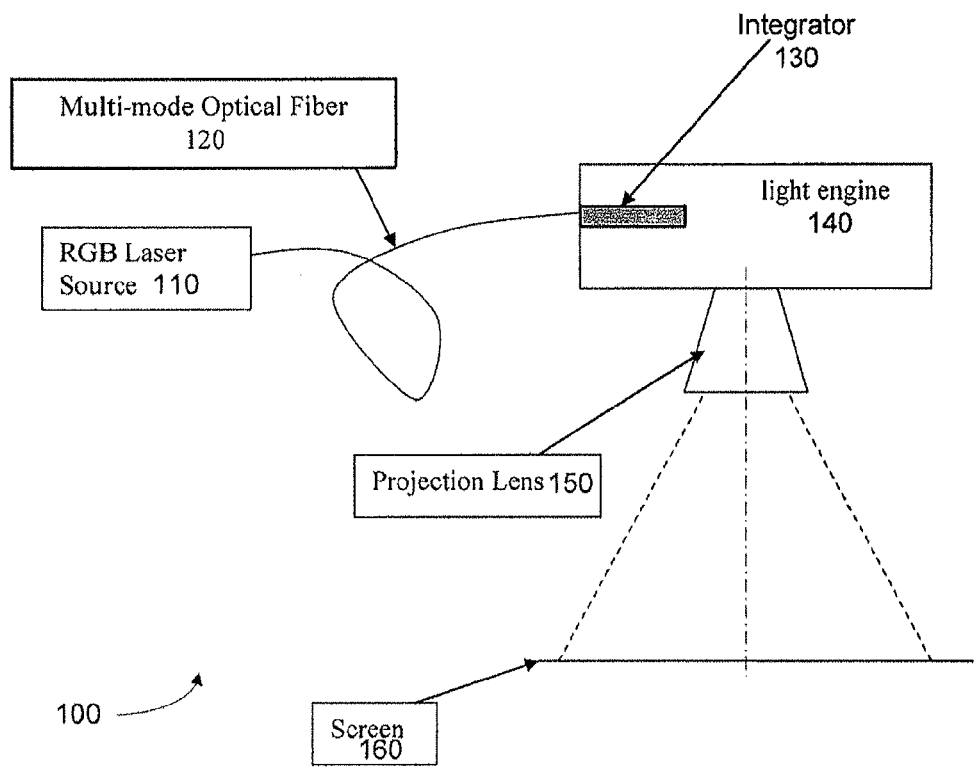

U.S. Office Action mailed Mar. 29, 2011 in U.S. Appl. No. 11/964,394.
U.S. Notice of Allowance mailed Jul. 19, 2011 in U.S. Appl. No. 11/964,394.
Partial English Translation of a Japanese Office Action mailed Apr. 9, 2013 for corresponding Japanese Application No. 2008-327646.
M. Imai et al., "Speckle-Pattern Contrast of Semiconductor Laser Propagating in a Multimode Optical Fiber", *Optics Communications*, Apr. 1980, vol. 33, No. 1, pp. 4-8.
Japanese Office Action mailed Apr. 8, 2014 for corresponding Japanese Patent Application No. 2008-327646.

\* cited by examiner

DECOHERED LASER LIGHT PRODUCTION SYSTEM

CROSS REFERENCE TO RELATED APPLICATIONS

This application is a divisional of U.S. patent application Ser. No. 11/964,394, filed Dec. 26, 2007, now U.S. Pat. No. 8,059,928 the disclosure of which is incorporated herein by reference.

FIELD

The specification relates generally to projection displays, and specifically to a decohered laser light production system.

BACKGROUND

Laser illumination is proving to be a promising illumination technology for projection displays because of its high colour gamut potential, low etendue and long lifetime. However, a major disadvantage of this technology is speckle in the image produced on the screen of the projection display due to the coherence of the laser. For example, it is well known from wave propagation theory that coherent wave sources (i.e. sources that are in phase) produce an interference pattern. A laser is a coherent source of light in which the wave components of the beam have a constant phase differential. When laser light is projected onto a screen for viewing, the waves reinforce and cancel each other thereby forming an interference pattern. To the viewer, this interference pattern appears as dark areas surrounded by many bright points of light in the projected image, an effect known as "speckle". The actual points of light seem to be formed at the retina of the eye and not on the screen. Although the effect is perceived differently by different viewers, most viewers agree it is disturbing.

There are techniques that address speckle. These techniques generally involve methods of eliminating coherence through the use of oscillations of the laser, the screen or components of the projections system, or through the use of multi-fiber optical bundles. However, these techniques are complex, expensive and not entirely effective.

U.S. Pat. No. 6,625,381 discloses a speckle suppressed laser projection system wherein a semiconductor laser and an optical fiber are arranged such that a portion of the laser beam entering the optical fiber is reflected off the optical fiber and back into the semiconductor laser which induces the laser emission to change from a single mode to a multimode pattern. Each mode in the multimode pattern has a different speckle pattern, which blend together when projected on a screen to reduce perceived speckle. However, the invention is dependent on the precise arrangement of the laser and the fiber, and further the laser and the fiber must be maintained at a constant temperature. Hence, this approach is both complex and energy inefficient, and does not eliminate speckle, but merely reduces it.

SUMMARY

A first broad aspect of an embodiment seeks to provide a decohered laser light production system comprising a laser source. The decohered laser light production system further comprises a multi-mode fiber comprising an input face, an output face and a body for propagating light from the input face to the output face, the input face arranged to accept laser light from the laser source, the body comprising a length such that laser light is generally decohered when exiting the output face.

In some embodiments of the first broad aspect, an NA ("numerical aperture") of the laser light is approximately equal to an NA of the multi-mode fiber.

In other embodiments of the first broad aspect, an NA of the laser light is less than the NA of the multi-mode fiber.

In further embodiments of the first broad aspect, an NA of the multi-mode fiber is about 0.65, the length is about 1 meter, a diameter of the input face is about 12 mm and a spot size of the laser light is about 8 mm2.

In yet further embodiments of the first broad aspectan NA of the multi-mode fiber is about 0.65, the length is greater than 1 meter, a diameter of the input face is about 12 mm and a spot size of the laser light is about 8 mm2.

In some embodiments of the first broad aspect, an NA of the multi-mode fiber is less than 0.65, and the length is greater than 1 meter.

In other embodiments of the first broad aspect, an NA of the multi-mode fiber is greater than 0.65, and the length is less than 1 meter.

In further embodiments of the first broad aspect, the decohered laser light production system further comprises at least one focusing element for focusing the laser light onto the input face.

In yet further embodiments of the first broad aspect, a spot size of the laser light is generally smaller than the input face.

In some embodiments of the first broad aspect, the laser light is impinging generally upon a centre point of the input face.

In other embodiments of the first broad aspect, the laser light is impinging generally perpendicular to the input face.

In further embodiments of the first broad aspect, the laser comprises a multi-wavelength laser. In some of these embodiments, the laser light production further comprises at least one dichroic filter for combining multiple wavelengths of light.

A second broad aspect of an embodiment seeks to provide a projector comprising a laser source. The projector further comprises a multi-mode fiber comprising an input face, an output face and a body for propagating light from the input face to the output face, the input face arranged to accept laser light from the laser source, the body comprising a length such that laser light is generally decohered when exiting the output face. The projector further comprises an integrator, an entrance of the integrator arranged to receive light from the output face. The projector further comprises a light engine, optically coupled to an exit of the integrator, for forming light received at the integrator into images. The projector further comprises a projection element for projecting the images onto a screen.

BRIEF DESCRIPTIONS OF THE DRAWINGS

Figure 2:
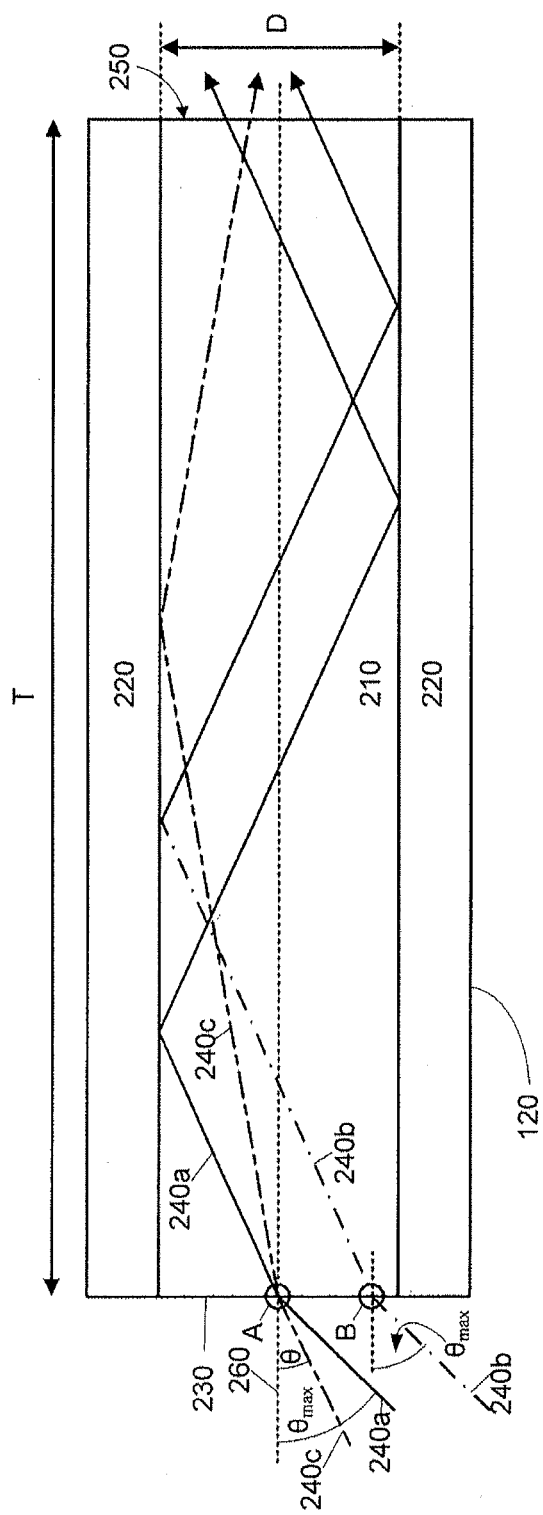

Embodiments are described with reference to the following figures, in which:

FIG. 1 depicts a system for de-cohering laser light, according to a non-limiting embodiment; and FIG. 2 depicts an optical fiber for de-cohering laser light, according to a non-limiting embodiment.

DETAILED DESCRIPTION OF THE EMBODIMENTS

FIG. 1 depicts a system 100 for de-cohering laser light to decreasing speckle in a projection display. The system 100 comprises a laser source 110 and a multi-mode optical fiber 120. The laser source and the multi-mode optical fiber 120 are arranged such that at least a portion of the light from the laser source 110 enters an input face 230 (depicted in FIG. 2) of the multi-mode optical fiber 120 at an off-normal angle. In some embodiments, the laser source 110 may be arranged such that light from the laser source enters the input face 230. In other embodiments, the input face 230 may be butted up directly to the laser source 110, while in other embodiments a focusing element (or a plurality of focusing elements) may be used to focus the laser source 110 onto the input face 230.

An output face 250 (also depicted in FIG. 2) of the optical fiber 120 is in turn optically coupled to an integrator 130 of a light engine 140 compatible with a projection display. Light travels from the laser source 110, and through the optical fiber 120 to the integrator 130. The light engine 140 generally comprises at least one image forming element (not depicted) that form light received at the integrator 130 into images that are projected through a projection lens 150 and onto a screen 160. In some embodiments, the light engine 140 further comprises illumination relay optics for relaying light from the integrator rod to the at least one image forming element.

Attention is now directed to FIG. 2, which depicts a longitudinal cross-section of the optical fiber 120, having a length T and a diameter D. In general, the optical fiber 120 comprises a multi-mode optical fiber having a core 210 and a cladding 220. The core 210 comprises an optical material, having an index of refraction $n_1$, for transmitting light from the laser source 110 that enters the input face 230 of the optical fiber, for example light rays 240a, 240b and 240c (collectively light rays 240 and generically light ray 240), to the output face 250. The cladding 220 comprises a material having an index of refraction $n_2$, with $n_2$ being generally less than $n_1$.

In general, multi-mode optical fibers will only propagate light that enters the input face of fiber within a certain cone, known as the acceptance cone of the fiber. The half-angle of this cone is called the acceptance angle, $\theta max$, determined by the indices of refraction the core and the cladding of the fiber. For the optical fiber 120, $n*\sin(\theta max)=(n_1^2-n_2^2)^{1/2}$, n comprising the index of refraction of air. Presuming n=1, $\sin(\theta max)=(n_1^2-n_2^2)^{1/2}$. This may also be expressed by the numerical aperture number (NA) of the optical fiber 120, as $NA=(n_1^2-n_2^2)^{1/2}$. Rays of light will generally enter the fiber with different angles to the fiber axis, up to the fiber's acceptance angle $\theta max$. Further, it is understood that light rays entering a multi-mode optical fiber at an angle $\theta$ to the longitudinal axis, will travel down the length of the fiber by reflecting off the interface of the core and the cladding, unless $\theta$ is greater than the acceptance angle, $\theta max$. In this case, the light rays will simply be absorbed by the cladding. Further, light rays that enter with a shallower angle travel by a more direct path, and arrive at the output face sooner than rays that enter at a steeper angle, which reflect many more times off the boundaries of the core as they travel the length of the fiber.

This is demonstrated in the optical fiber 120. The light ray 240a enters the input face 230 at a point A (the intersection of the longitudinal axis 260 and the input face 230), at the acceptance angle $\theta max$, and bounces twice from the interface between the core 210 and the cladding 220 as the light ray 240a travels the length T, before exiting the output face 250. In contrast, the light ray 240c enters the input face 230 at the point A, at an angle $\theta$ which is less than the acceptance angle $\theta max$, and bounces once from the interface between the core 210 and the cladding 220 as the light ray 240a travels the length T, before exiting the output face 250. If the light ray 240a and the light ray 240c represent light rays from the laser source 110 which are coherent upon entering the input face 230, they will be decoherent when exiting the output face 250 as they take different times to travel through the optical fiber 120 along paths of different length. In other words, a phase difference between the light rays 240a and 240c is introduced as they reflect down the length T. The total effect is that the light from the laser source 110 that enters the input face 230 has generally de-cohered once it exits the output face 250.

While the light ray 240a and the light ray 240c are converging at the point A when they enter the input face 230, light from the laser source 110 will generally impinge on the input face 230 over an area, rather than a point. However, this only serves to further enhance the decoherence introduced by passing light from the from the laser source 110 through optical fiber 120. For example, the light ray 240c enters the input face 230 at a point B, off centre from the input face, at the acceptance angle $\theta max$ (i.e. parallel to the light ray 240b). However, the light ray 240c travels along a path that is different in length from the path of the light ray 240a they reflect down the length T of the optical fiber 120, by virtue of the entrance points on the input face 230 being different. Again, this has the effect of introducing a phase difference between light rays 240 that enter the input face 230 at the point A (e.g. light ray 240a) and light rays 240 that enter the input face 230 at the point B (e.g. light ray 240b), even if they are in parallel, as the light rays 240 reflect down the length T of the optical fiber 120.

However, the degree of decoherence of the light which exits the output face 250 may be affected by the NA of the optical fiber 120, relative to NA of the laser light (i.e. the cone of the laser light). In other words, if the NA of the optical fiber 120 is small relative to the NA of the laser light, the optical fiber 120 may transmit only a portion of the laser light, as a significant portion of the laser light may enter the optical fiber 120 at an angle which is greater than the acceptance angle $\theta max$. Hence, the decoherence effect will be reduced as the cone of the laser light will be reduced (i.e. angular spread of light is reduced due to the mismatch in NA).

Moreover, the degree of decoherence of the light which exits the output face 250 is additionally affected by the length T of the optical fiber 120, as the phase differences which are introduced will become more pronounced, the further the light travels in the optical fiber 120 (i.e. more bouncing, greater differences in path length etc.). Furthermore, if the NA of the optical fiber 120 is small relative to the NA of the laser light, longer lengths of the optical fiber 120 are desirable to address the reduced decoherence effect that results from the reduced angular spread.

However, as the core 210 also absorbs a certain amount of the light, and in practical implementations of embodiments, a trade-off between decoherence and power loss of the light (i.e. loss of intensity on the screen 160) may be taken into account when choosing the length T.

In any event, the final effect is that the light exiting the output face 250 is generally decoherent when it enters the integrator 130, and hence speckle in the image projected onto the screen is reduced or eliminated.

A successful prototype is now described, in which the optical fiber 120 comprises a 3M™ HL (high luminance) multi-mode light fiber (from 3M, 3M Center St. Paul, Minn. 55144-1000) of a diameter D of 12 mm, and an NA of 0.65. To demonstrate embodiments, several different lengths of the 3M™ AL fiber were used, described below, ranging from 0.12 meters to 5.3 meters.

Further, in the non-limiting example, the laser source 10 comprises a red, green and blue laser source (from Novalux, 1220 Midas Way, Sunnyvale, Calif. 94085). In this example, the laser source 110 comprises 48 laser beams in an array of 2.times.24 parallel beams, arranged in 2 rows of 24 beams the two rows being separated by 1 mm and each beam within a row separated by 0.3 mm, one array for each colour. Dichroic filters were used to bring the three colours into a common path. Focusing elements (e.g. lens etc., are used to focus all the parallel means onto the entrance face 230 of the optical fiber 120 to produce a spot size of 1 mm by 8 mm, having an NA<0.65.

However, any suitable multi-mode optical fiber and any suitable laser source are within the scope of present embodiments. While not strictly limiting, the laser source 10 and the optical fiber 120 are preferably chosen such that the NA of the laser source 10 is generally equal to or less than the NA of the optical fiber 120.

Further, in the particular non-limiting embodiment, the light engine 140 comprises a projection light engine, however any other suitable light engine which can accept light for producing an image is within the scope of the present invention.

The input power of the laser source 110 was measured at the input face 230 of the optical fiber, and the output power of the optical fiber 120 was measured at the output face 250. The input power of the laser source 110 was measured to be 2.2 watts. The output power for four different lengths of the optical fiber 120 was measured. The light which was emitted from the optical fiber 120 was visually inspected to ascertain the level of de-speckle for each length of the optical fiber 120. The light emitted from a 1.0 meter length of the optical fiber 120 was also was visually inspected to ascertain the level of de-speckle. While the output power was not specifically measure for this length, the output power can estimated by interpolating the output power from the other lengths of the optical fiber 120. Results are shown in Table 1.

TABLE 1

| Fiber Length (meters) | Output Power (Watts) | Perceivable despeckle |
| --- | --- | --- |
| 0.12 | 1.6 | No |
| 0.45 | 1.3 | No |
| 1.0 | Not Measured | Yes |
| 3.0 | 0.8 | Yes |
| 5.3 | 0.6 | Yes |

It was found that speckle was completely eliminated at approximately 1 meter length of the 3M™ HL fiber with a diameter of 12 mm and an NA of 0.65. While longer lengths of the 3M™ HL fiber with a diameter of 12 mm and an NA of 0.65 could be used to eliminate speckle, it can be seen from Table 1 that longer lengths of the optical fiber 120, also lead to decrease in output power.

While an approximately 1 meter length of the 3M™ HL fiber with a diameter of 12 mm, and an NA of 0.65 was found to provide a suitable tradeoff between de-speckle and power loss, other lengths of multi-mode fiber having other diameters and other NAs are within the scope of the present specification. For example, a multi-mode fiber with an NA of less than 0.65, and a length greater than 1 meter may be used. Alternatively, a multi-mode fiber with an NA of greater than 0.65, and a length less than 1 meter may be used.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

The invention claimed is:

1. An apparatus for decohering laser light from a laser source, comprising:
    a single multi-mode fiber comprising an input face for receiving the laser light, an output face and a body for propagating light there between, a combination of a length of the body and an NA ("numerical aperture") of the multimode fibre selected to generally decohere the laser light between the input face and the output face, the NA of the multimode fibre being approximately equal to or greater than an NA of the laser light.

2. The apparatus of claim 1, wherein the combination of the NA of said multimode fiber and the length is about 0.65, and about 1 meter.

3. The apparatus of claim 1, wherein the combination of the NA of said multimode fiber and the length is about 0.65, and greater than 1 meter.

4. The apparatus of claim 1, wherein the combination of the NA of said multimode fiber and the length is less than 0.65, and greater than 1 meter.

5. The apparatus of claim 1, wherein the combination of the NA of said multimode fiber and the length is greater than 0.65, and less than 1 meter.

6. The apparatus of claim 1, further comprising at least one focussing element for focussing the laser light onto the input face.

7. The apparatus of claim 1, wherein the input face is generally larger than a spot size of the laser light.

8. The apparatus of claim 1, wherein a centre point of the input face is arranged to receive the laser light.

9. The apparatus of claim 8, further comprising at least one dichroic filter for combining multiple wavelengths of light.

10. The apparatus of claim 1, wherein the input face is arranged generally perpendicular to the laser light.

11. The apparatus of claim 1, wherein the laser comprises a multi-wavelength laser.

12. A projector comprising:
    a laser source;
    a single multi-mode fiber comprising an input face for receiving the laser light, an output face and a body for propagating light there between, a combination of a length of the body and an NA of the multimode fibre selected to generally decohere the laser light between the input face and the output face;
    an integrator, an entrance of the integrator arranged to receive light from the output face;
    a light engine, optically coupled to an exit of the integrator, for forming light received at the integrator into images; and
    a projection element for projecting the images onto a screen.

13. An apparatus for decohering laser light from a laser source, comprising:
    a single multi-mode fiber comprising an input face for receiving the laser light, an output face and a body for propagating light there between, a combination of a length of the body and an NA ("numerical aperture") of the multimode fibre selected to generally decohere the laser light between the input face and the output face, wherein a centre point of the input face is arranged to receive the laser light; and,
    at least one dichroic filter for combining multiple wavelengths of light.

* * * * *